United States Patent
Yuan et al.

(10) Patent No.: US 11,357,354 B2
(45) Date of Patent: Jun. 14, 2022

(54) NONSTICK UTENSIL AND MANUFACTURING METHOD THEREOF

(71) Applicant: Wuhan Supor Cookware Co., Ltd., Wuhan (CN)

(72) Inventors: Huating Yuan, Wuhan (CN); Ming Zhang, Wuhan (CN); Yisheng Qu, Wuhan (CN); Weiping Jin, Wuhan (CN)

(73) Assignee: Wuhan Supor Cookware Co., Ltd.

( * ) Notice: Subject to any disclaimer, the term of this patent is extended or adjusted under 35 U.S.C. 154(b) by 0 days.

(21) Appl. No.: 16/748,157

(22) Filed: Jan. 21, 2020

(65) Prior Publication Data

US 2020/0229635 A1 Jul. 23, 2020

(30) Foreign Application Priority Data

Jan. 18, 2019 (CN) .......................... 201910048141.3
Jan. 18, 2019 (CN) .......................... 201910048142.8

(51) Int. Cl.
*A47J 36/02* (2006.01)
*C23C 4/11* (2016.01)
(Continued)

(52) U.S. Cl.
CPC ............ *A47J 36/025* (2013.01); *A47J 36/02* (2013.01); *A47J 37/10* (2013.01); *C23C 4/02* (2013.01); *C23C 4/11* (2016.01); *C23C 4/134* (2016.01); *C23C 24/04* (2013.01); *C23C 24/106* (2013.01); *C23C 30/005* (2013.01)

(58) Field of Classification Search
CPC .......... A47J 36/025; A47J 36/04; A47J 36/02; A47J 37/10; C23C 4/11; C23C 4/10; C23C 4/02; C23C 4/134; C23C 24/04; C23C 24/106; C23C 24/103; C23C 30/005
USPC ......... 220/573.2, 573.1, 62.13, 62.11, 62.15, 220/62.17, 912
See application file for complete search history.

(56) References Cited

U.S. PATENT DOCUMENTS 2,071,817 A * 2/1937 Dean .................. C23D 5/08
427/235
2,724,526 A * 11/1955 Russell ................ A21B 3/13
428/629

(Continued)

FOREIGN PATENT DOCUMENTS

CN          103849261 A      6/2014
CN          104887060 A      9/2015
(Continued)

*Primary Examiner* — Robert J Hicks
(74) *Attorney, Agent, or Firm* — The Webb Law Firm (57) ABSTRACT

A nonstick utensil and its method of manufacturing are presented. The nonstick utensil includes a utensil substrate and a nonstick layer covering an inner surface of the utensil substrate. The material of the nonstick layer includes black titanium dioxide. An inner surface of a substrate of the nonstick utensil is covered with a material having black titanium dioxide applied by hot spraying, cold spraying or plasma spraying, so that a black titanium dioxide nonstick layer is formed. Compared to the prior art, instead of using a coating material, a nonstick layer having black titanium dioxide on a surface of a substrate is provided, having nonstick properties due to the low surface energy characteristic of black titanium dioxide.

20 Claims, 3 Drawing Sheets

(51) Int. Cl.
  *C23C 4/134* (2016.01)
  *C23C 4/02* (2006.01)
  *C23C 24/04* (2006.01)
  *C23C 24/10* (2006.01)
  *C23C 30/00* (2006.01)
  *A47J 37/10* (2006.01)

(56) References Cited

U.S. PATENT DOCUMENTS

| | | | | |
|---|---|---|---|---|
| 4,250,215 | A * | 2/1981 | Mayer | A47J 36/02 206/524.3 |
| 5,943,950 | A | 8/1999 | Taoda et al. | |
| 6,248,435 | B1 * | 6/2001 | Leck | B05D 3/207 220/573.2 |
| 2005/0208272 | A1 | 9/2005 | Groll | |
| 2006/0090593 | A1 * | 5/2006 | Liu | C23C 24/04 75/252 |
| 2008/0237241 | A1 * | 10/2008 | Buffard | A47J 36/025 220/573.2 |
| 2009/0159601 | A1 * | 6/2009 | Berrux | A47J 36/02 220/573.1 |
| 2011/0192850 | A1 * | 8/2011 | Le Bris | A47J 36/025 220/573.2 |

FOREIGN PATENT DOCUMENTS

| | | |
|---|---|---|
| CN | 105386032 A | 3/2016 |
| CN | 105476490 A | 4/2016 |
| CN | 205923691 U | 2/2017 |
| CN | 206403638 U | 8/2017 |
| CN | 108618573 A | 10/2018 |
| CN | 108787370 A | 11/2018 |
| CN | 109077620 A | 12/2018 |
| CN | 109136817 A | 1/2019 |
| DE | 2401085 A1 | 7/1975 |
| JP | H1191042 A | 4/1999 |
| WO | 2008099536 A1 | 8/2008 |

* cited by examiner

S1: providing a utensil body, and cleaning and roughening the surface of a utenisl substrate S2: heating the material comprising black titanium dioxide by a high-pressure plasma flame or a supersonic flame to a melted state; spraying the material comprising black titanium dioxide in the melted state to the inner surface of the substrate, forming a nonstick layer

FIG. 6

NONSTICK UTENSIL AND MANUFACTURING METHOD THEREOF

CROSS-REFERENCE TO RELATED APPLICATIONS

This application claims priority to Chinese Patent Application Nos. 201910048141.3 and 201910048142.8, both filed Jan. 18, 2019, the disclosures of which are hereby incorporated by reference in their entirety.

FIELD OF THE INVENTION

The invention relates to the field of cooking utensil products, and in particular, to a nonstick utensil and manufacturing method thereof.

BACKGROUND OF THE INVENTION

Nonstick utensils (for example, nonstick pans) currently in the market are generally manufactured by spraying a fluorine-based coating (Teflon, PTFE) or ceramic coating on the surface of a substrate.

Existing fluororesin nonstick pans achieve the nonstickness by means of their low surface energy of a fluororesin (PTFE and its derivatives) after it has been sintered to form a film. However, fluororesin nonstick pans have the following drawbacks: (1) they are soft and susceptible of being scratched or even broken when a hard food material is being stir fried; they have poor wear resistance, resulting in a short service life; (2) existing fluororesin nonstick coating generally have a small thickness (not greater than 80 μm), and after being subject to wear for a certain time, the coating is susceptible of being worn out completely; existing fluororesin nonstick pans are made by sintering after air spraying, but when the sprayed coating is thick (greater than 80 μm), the coating is susceptible of cracking after the sintering is complete; (3) adapted protective spatulas (made of wood, bamboo, silicon, or nylon) are needed, the head of which is thick and solid and does not lend itself to stir frying, which results in a poor cooking experience.

Existing ceramic coatings are formed by the sol-gel process. A large quantity of oleophobic and hydrophobic methyl groups are formed at the surface of a coating. Nonstickness is achieved by methyl groups which spread densely over the surface of the coating. However, ceramic coated nonstick pans have the following drawbacks: (1) nonstick layer methyl groups densely spread over the surface of a ceramic coating are very easy to be destroyed in conditions of high temperature (for example 200° C., a normal cooking temperature), friction (stir frying), or alkalinity (alkaline food, or being cleaned with a dishwashing liquid), which results in a reduction of nonstickness; (2) similar to fluororesin nonstick pans, because the coatings are brittle, ceramic coated nonstick pans need to be used with protective spatulas and cannot be used with iron spatulas that provide a better cooking experience.

Therefore, existing nonstick pans need to be improved, so as to prolong their nonstickness.

SUMMARY OF THE INVENTION

The main objective of the present invention is to provide a nonstick pan to overcome the drawbacks of nonstick pans in the prior art, such as poor temperature resistance, susceptibility to being scratched or broken, and a short life of nonstickness. The objectives of the present invention are achieved by the following technical solutions.

An aspect of the present invention provides a nonstick utensil, comprising:
  utensil substrate; and a nonstick layer covering an inner surface of the utensil substrate;
  the material of the nonstick layer comprising black titanium dioxide.

Optionally, the material of the nonstick layer comprises 60 to 99.5% of black titanium dioxide ceramic and 40 to 0.5% of ceramic and/or metal or nonmetal other than black titanium dioxide. Alternatively, the nonstick layer is a layer of black titanium dioxide ceramic with a purity of 50 to 99.5%. In addition to black titanium dioxide, the material of the nonstick layer further comprises 0.5 to 50% of another ceramic and/or metal or nonmetal.

Optionally, the metal is one or more of: zinc and its alloys; titanium and its alloys; chromium and its alloys; nickel and its alloys; cobalt and its alloys; copper and its alloys; zirconium and its alloys; yttrium and its alloys; molybdenum and its alloys; vanadium and its alloys; silver and its alloys. The nonmetal is one or more of: graphite, boron, silicon, phosphorus, titanium carbide, titanium nitride, titanium diboride, silicon carbide, tungsten carbide, silicon nitride, boron nitride, calcium oxide, zirconia, alumina, chromium oxide and titanium sub oxide.

Optionally, a metallic base layer is further provided between the utensil substrate and the nonstick layer, the hardness of the metallic base layer being above Moh's hardness 3.

Optionally, the metallic powder used to prepare the metallic base layer has a particle size of 25 μm to 100 μm.

Optionally, the metallic base layer has a thickness of 50 μm to 300 μm, and a surface of the metallic base layer has a surface roughness of 10 μm to 50 μm.

Optionally, an inner surface of the utensil substrate is provided with protruding patterns, the section of the patterns being in the form of a triangle, quadrilateral, polygon or circle.

Optionally, the nonstick layer is formed by hot spraying, cold spraying or solid-phase sintering.

Optionally, the nonstick layer has a surface roughness of 10 to 50 μm and a thickness of 50 to 300 μm.

Optionally, the black titanium dioxide is in the form of particles with a particle size of 25 to 50 μm.

Optionally, an inner surface of the utensil substrate is a layer of aluminum and/or aluminum alloy, and an anodized film layer or micro-arc oxidized film layer is further provided between the layer of aluminum and/or aluminum alloy and the nonstick layer.

Another aspect of the present invention provides a method of manufacturing a nonstick utensil, comprising:
  step S1: providing a utensil body;
  step S2: covering an inner surface of a substrate of the utensil body with a material comprising black titanium dioxide, and forming a nonstick layer comprising black titanium dioxide.

Optionally, in the step S2, the inner surface of the substrate is covered with the material comprising black titanium dioxide by hot spraying, cold spraying, or solid-phase sintering to form the nonstick layer.

Optionally, in the method described in the present invention, the step S2 comprises:
  heating the material comprising black titanium dioxide to a melted state by a high-pressure plasma flame or a supersonic flame;

spraying the material comprising black titanium dioxide in the melted state to the inner surface of the substrate to form the nonstick layer.

Optionally, in the method described in the present invention, the step S2 comprises:

introducing the material comprising black titanium dioxide into a powder feeder, the powder feeding speed being maintained within the range of 20 to 40 g/min;

heating the material comprising black titanium dioxide until melted, and then spraying it to the inner surface of the substrate, forming the nonstick layer; wherein, the spray distance is 140 to 160 mm, the arc current is 450 to 550 A, the hydrogen pressure is 0.5 to 0.9 MPa, the hydrogen flow rate is 6 to 10 L/min, the argon pressure is 0.5 to 0.9 MPa, and the argon flow rate is 40 to 70 L/min.

Optionally, in the method described in the present invention, the step S2 comprises:

mixing graphite of a mass ratio of 0.5 to 10%, polyethylene glycol of a mass ratio of 0.1 to 20%, and powder-form black titanium dioxide for the rest, to form a powder mixture;

adding the powder mixture to an aqueous solvent, adding an additive and stirring well, obtaining a slurry; preferably, the aqueous solvent is chosen from water and/or ethanol; the additive is chosen from a surfactant and/or a defoamer;

covering the inner surface of the utensil body with the slurry and sintering in an atmosphere of an inert gas. Preferably, the sintering is performed in an atmosphere of argon, at a sintering temperature of 300 to 900° C., for a sintering duration of 0.5 to 3 hours, so as to obtain the nonstick layer comprising black titanium dioxide.

Optionally, in the method described in the present invention, the step S2 comprises:

introducing powder-form black titanium dioxide of 300 to 500 mesh into a powder feeder;

heating the powder-form black titanium dioxide to 200 to 600° C.;

spraying the powder-form black titanium dioxide to the inner surface of the substrate by using compressed air, azote or argon as a spray gas and heating it to 200 to 600° C.; wherein, the spray distance is 10 to 30 mm, and the spray gas pressure is 1.5 to 2.5 MPa.

Optionally, in the method described in the present invention, the step S1 further comprises performing a pre-treatment to the surface of the substrate of the utensil body, the pre-treatment comprising: cleaning and roughening the surface of the substrate, the roughness of the surface of the substrate after the roughening being 2 to 6 μm.

Optionally, in the method described in the present invention, the black titanium dioxide is in powder form, and the particles of the black titanium dioxide have a particle size of 25 to 50 μm. If black titanium dioxide powder with a particle size smaller than 25 μm is to be used for the material of the nonstick layer, it will result in difficulties in preparing the powder and a high cost. A rough structure on a microscopic level can reduce the area of contact between a food material and the utensil. Therefore, if black titanium dioxide powder with a particle size larger than 50 μm is used for the material of the nonstick layer, a rough structure on a microscopic level cannot be formed.

Optionally, in the method described in the present invention, the method further comprises polishing the coating formed at the surface of the substrate.

Optionally, in the method described in the present invention, the method further comprises: after the step S2, performing a sealing treatment of the nonstick layer formed at the surface of the substrate, the sealing treatment comprising: covering the surface of the nonstick layer with a sealing agent by soaking, spraying or wiping. Further, the sealing agent used in the sealing treatment is chosen from an inorganic or organic coating material in conformance with food sanitation standards, such as a ceramic or fluororesin.

Figure 2:
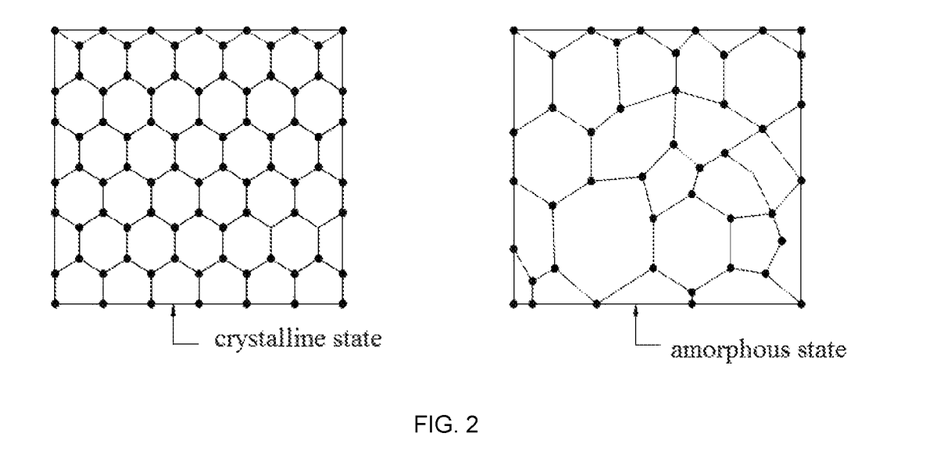
FIG. 2 is a schematic view of the crystalline structure of the core and the amorphous structure (non-crystalline structure) of the shell in the core-shell structure of black titanium dioxide.

The present invention achieves the objective of nonstickness by forming a nonstick layer comprising black titanium dioxide on a surface of a substrate, thanks to the low surface energy of the black titanium dioxide in it. Specifically, black titanium dioxide is of a core-shell structure that has a highly crystalline core and a shell with lattice disorder. There are defaults such as the presence of oxygen vacancy and Ti (III) in such core shell structure, which is an amorphous structure. The arrangement of atoms in the three dimensional space is in a state of "short range order and long range disorder" (as shown in FIG. 2), resulting in black titanium dioxide having low surface energy and therefore being able to achieve the effect of nonstickness. Consequently, the technical solutions provided by the present invention can achieve the following beneficial effects: instead of using a coating material, the present invention achieves the objective of nonstickness by forming a nonstick layer comprising black titanium dioxide on a surface of a substrate thanks to the low surface energy characteristic of black titanium dioxide. In addition, the present invention can achieve the above-described objective by a hot spraying process, which is simple and efficient and achieves high coating quality.

REFERENCES

11—substrate
12—nonstick layer
13—protruding patterns
14—second protruding patterns
15—metallic base layer

DETAILED DESCRIPTION OF THE EMBODIMENTS

The following content describes further in detail the present application in reference to the accompanying drawings and embodiments in order to further clarify the objective, technical solutions and advantages of the present application. It should be understood that the specific embodiments described here are merely used to explain the present application and not to limit the present application.

Into the following description, the cookware would also be called the cooking utensil, the non-stick vessels could also be called the nonstick utensils, the base material could also be called substrate, the metal priming layer could also be the called metallic base layer, the thermal spraying could also be called the hot spraying, the plasma spraying could also be called the ion spraying, the non-stick vessel could also be called the nonstick utensil.

Figure 1:
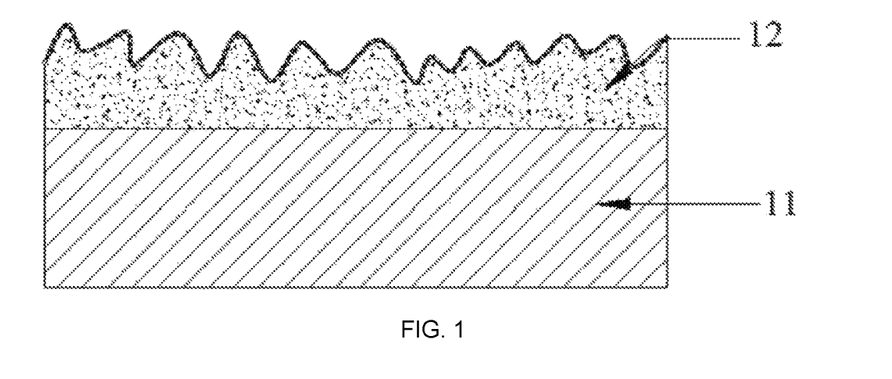
FIG. 1 is a schematic structural view of the structure of a substrate and a nonstick layer of a nonstick utensil of the present invention.

An aspect of the present invention provides a nonstick utensil. As shown in FIG. 1, which shows a schematic structural view of the structure of a substrate and a nonstick layer of a nonstick utensil of the present invention, wherein, 11 is the substrate of the nonstick utensil; 12 is the nonstick layer. Specifically, 12 is a nonstick layer comprising black titanium dioxide.

In the nonstick utensil described in the present invention, the material of the nonstick layer comprises 60 to 99.5% of black titanium dioxide and 40 to 0.5% of a ceramic material and/or metal and/or nonmetal other than black titanium dioxide for the rest. Their comparative testing results are shown in Table 3. Specifically, the metal is one or more of: zinc and its alloys; titanium and its alloys; chromium and its alloys; nickel and its alloys; cobalt and its alloys; copper and its alloys; zirconium and its alloys; yttrium and its alloys; molybdenum and its alloys; vanadium and its alloys; silver and its alloys. The nonmetal is one or more of: graphite, boron, silicon, phosphorus, titanium carbide, titanium nitride, titanium diboride, silicon carbide, tungsten carbide, silicon nitride, boron nitride, calcium oxide, zirconia, alumina, chromium oxide and titanium sub oxide.

In some embodiments, the material of the nonstick layer comprises black titanium dioxide and another ceramic material, wherein, the content of black titanium dioxide is 60%, 65%, 70%, 75%, 80%, 85%, 90%, 95%, 96%, 96.5%, 97.5%, 98.5%, or 99.5%; the content of the ceramic material is 0.5%, 1.5%, 2.5%, 3.6%, 4%, 5%, 10%, 15%, 20%, 25%, 30%, 35%, or 40%.

In the nonstick pan of the present invention, a nonstick layer comprising black titanium dioxide is formed at a surface of the substrate of the nonstick utensil, achieving the objective of nonstickness by means of the low surface energy of black titanium dioxide. Black titanium dioxide has a core-shell structure with a highly crystalline core structure surrounded by a shell with lattice disorder. In such core-shell structure, the core structure has a crystalline state structure (as shown in FIG. 2); there are defaults such as oxygen vacancy and the presence of Ti (III) in the shell structure, which is an amorphous structure.

Such a core-shell structure of black titanium dioxide makes the arrangement of atoms in the three-dimensional space to exhibit a state of "short range order and long range disorder" (as shown in FIG. 2), with low surface energy, so that the nonstickness effect can be brought.

Optionally, the surface roughness of the nonstick layer 12 is 10 to 50 μm. To improve the user experience of the product, the nonstick layer of the nonstick utensil needs a certain roughness. A roughness within the range 10 to 50 μm meets not only the requirements of industrial production, but also the requirement of user experience. It can be understood that if the roughness is lower than 10 μm, not only it is hard to realize in terms of process, but also the production cost increases greatly; if the roughness is higher than 50 μm, such a relatively high roughness and therefore the large friction resistance affect consumer's experience and make it not practical. Preferably, the surface roughness of the nonstick layer is 10 μm, 30 μm, 45 μm, or 50 μm. Their comparative testing results are shown in Table 4.

Optionally, the surface thickness of the nonstick layer 12 is 50 to 300 μm. The inventors of the present invention have discovered in actual production that, if the thickness of the nonstick layer comprising black titanium dioxide is smaller than 50 μm, the forming the nonstick layer is hard to realize in terms of process; if the thickness of the nonstick layer comprising black titanium dioxide is greater than 300 μm, there may be the risk of bursting apart caused by excessive internal stresses of the nonstick layer, thus resulting in quality problems of the nonstick utensil and increasing production cost. Preferably, the surface thickness of the nonstick layer is 50 μm, 150 μm, 180 μm, 250 μm, or 300 μm.

In the present invention, a suitable particle size of the black titanium dioxide particles forming the above-described nonstick layer 12 is 25 to 50 μm. For example, the particle size of black titanium dioxide particles can be 25 μm, 30 μm, 35 μm, 40 μm, 45 μm, or 50 μm. If black titanium dioxide powder with a particle size smaller than 25 μm is used, the preparation of the powder will be difficult to realize and high costs will incur. A rough structure on a microscopic level can reduce the contact area between a food material and a utensil. Therefore, if black titanium dioxide powder with a particle size greater than 50 μm is used, a rough structure on a microscopic level cannot be formed. Preferably, the particle size of the black titanium dioxide is: 25 μm, 35 μm, 40 μm, or 50 μm.

In the nonstick utensil of the present invention, the substrate can be chosen from one or more of aluminum, aluminum alloys, iron, stainless steel, copper, copper alloys, titanium, titanium alloys, glass, ceramic, or their composite materials. When the inner surface of the substrate is a layer of aluminum and/or aluminum alloy, an oxidized layer is further provided between the aluminum and/or aluminum alloy layer and the nonstick layer. The oxidized layer is an anodized film layer or micro-arc oxidized film layer. When the oxidized layer is an oxidized aluminum film layer formed by anodizing, the thickness of the oxidized aluminum film layer is 30 μm to 50 μm; and the hardness of the oxidized aluminum film layer is 350 HV to 1000 HV. Preferably, the thickness of the oxidized aluminum film layer is: 30 μm, 38 μm, 45 μm, or 50 μm; and its hardness is: 350 HV, 500 HV, 700 HV, 800 HV, 950 HV, or 1000 HV.

Figure 4:
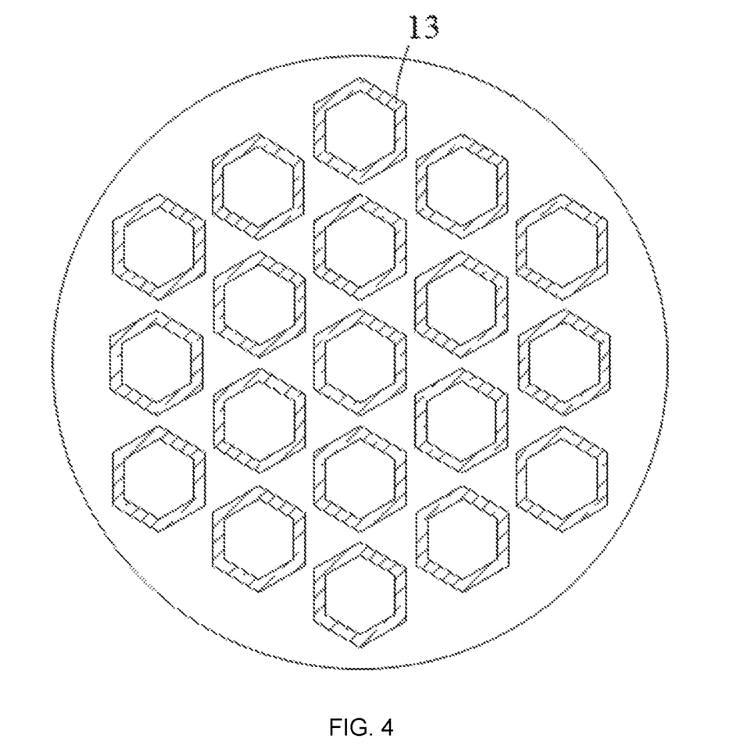
FIG. 4 is a top view of a substrate of a nonstick utensil provided by an embodiment of the present invention.
Figure 5:
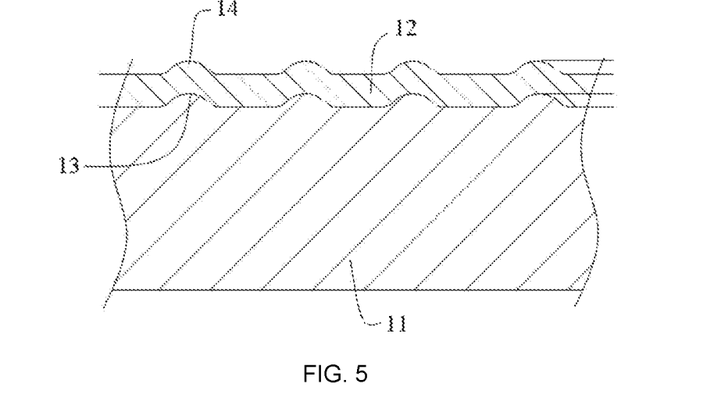
FIG. 5 is a partial sectional view of a nonstick utensil provided by an embodiment of the present invention.

FIG. 4 and FIG. 5 show, respectively, a top view and a partial sectional view of the substrate of an embodiment of the nonstick utensil of the present invention. An inner surface of the substrate 11 of the nonstick utensil as shown in FIG. 4 is provided with protruding patterns 13 having a hexagonal section. As shown in FIG. 5, the hexagonal protruding patterns protrude from the surface of the substrate 11 and have a certain height relative to the surface of the substrate. When the nonstick layer 12 covers the inner surface of the substrate 11, part of the nonstick layer 12 covers the protruding patterns 13 of the substrate 11, so that second protruding patterns 14 correspondingly formed on the nonstick layer 12. In the present embodiment, the protruding patterns 13 can have a section in form of a triangle, quadrilateral, polygon or circle. During the use of the nonstick utensil, the second protruding patterns 14 on the surface of the nonstick layer 12 can enter into direct contact with hard substances such as a food material or a spatula first, so as to be worn and damaged first. Thus, any direct contact between the rest of the nonstick layer 12 and hard substances can be avoided, so as to avoid wearing and damaging the rest of the nonstick layer 12, and thus increasing the life of nonstickness of the nonstick utensil. Preferably, the protruding patterns 13 are evenly distributed on the inner surface of the substrate 11 with various layouts, such as a ring-shaped layout, a helical layout or a radially radiating layout. The distance between any two adjacent protruding patterns 13 can range from 0.08 mm to 0.5 mm. The protruding height of each protruding pattern 13 relative to the surface of the substrate is 0.02 mm to 0.1 mm. More preferably, the distance between any two adjacent protruding patterns 13 is: 0.08 mm, 0.15 mm, 0.2 mm, 0.4 mm, 0.45 mm, or 0.5 mm. The protruding height of each protruding pattern 13 is 0.02 mm, 0.05 mm, 0.07 mm, 0.08 mm, or 0.1 mm.

Figure 3:
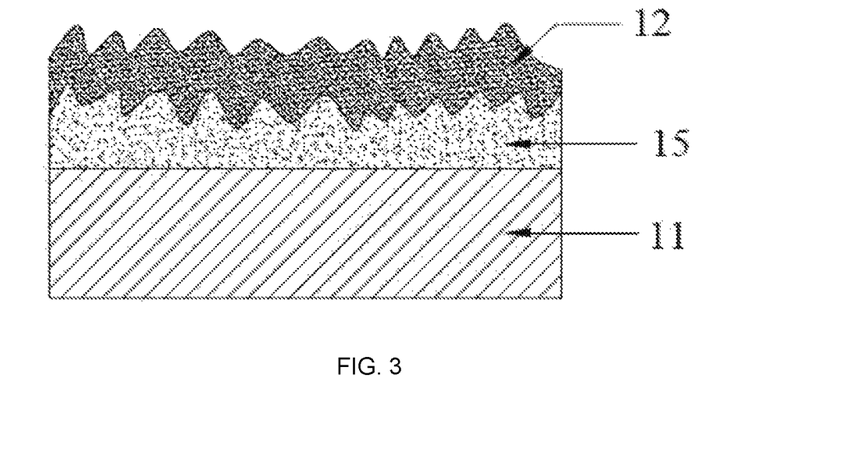
FIG. 3 is a schematic view of the structure of a substrate, a metallic base layer, and a nonstick layer of a nonstick utensil of the present invention.

As shown in FIG. 3, in an embodiment of the nonstick utensil described in the present invention, a metallic base layer 15 can be further provided between the utensil substrate 11 and the nonstick layer 12. The hardness of the metallic base layer 15 is above Moh's hardness 3. In this embodiment of the nonstick utensil of the present invention, by spraying a layer of metal powder with a high hardness to the surface of the substrate of the utensil, the hardness of the substrate can be increased, so as to prevent the nonstick layer from being damaged due to the deformation of the substrate. At the same time, the metallic base layer can also increase the corrosion resistance of the substrate and prolong the service life of the nonstick utensil. In addition, a structure with uneven surface can also be provided at the metallic base layer, so as to enhance the binding force between the substrate and the nonstick layer.

Preferably, the metallic base layer 15 is one or more of: a layer of iron or its alloys; a layer of titanium or its alloys; a layer of chromium or its alloys; a layer of nickel or its alloys; a layer of cobalt or its alloys; a layer of zirconium or its alloys; a layer of yttrium or its alloys; a layer of molybdenum or its alloys; a layer of vanadium or its alloys.

In another embodiment of the nonstick utensil described in the present invention, the metallic powder used to make the metallic base layer has a particle size of 25 μm to 100 μm. In actual operations, if the particle size of the metallic powder is smaller than 25 μm, it will be difficult to prepare the powder, and the cost will be high. If the particle size of the metallic powder is larger than 100 μm, on one hand, the requirements for the hot spraying device are high, on the other hand, the roughness of the inner surface of the finished nonstick utensil will be high, thus the friction in the course of stir frying will be large, and the nonstickness will be very poor, ultimately affecting a product's life and user experience. Preferably, the particle size of the metallic powder of the metallic base layer is: 25 μm, 50 μm, 75 μm, 80 μm, or 100 μm.

In another embodiment of the nonstick utensil described in the present invention, the metallic base layer has a thickness of 50 μm to 300 μm, and the surface of the metallic base layer has a surface roughness of 10 μm to 50 μm. If the thickness of the metallic base layer is smaller than 50 μm, the process is hard to be performed; if the thickness of the metallic base layer is greater than 300 μm, although not much effect on the roughness, but the excessive internal stresses will incur the risk of bursting apart. The thickness of the metallic base layer can be: 50 μm, 100 μm, 180 μm, 240 μm, 250 μm, 280 μm, or 300 μm.

An aspect of the present invention provides a method of manufacturing the nonstick utensil of the present invention. The nonstick layer of the nonstick utensil of the present invention can be manufactured by an existing method to form a material comprising black titanium dioxide at the surface of the substrate. Specifically, such material can be formed at the surface of the substrate by methods such as hot spraying, plasma spraying, supersonic flame spraying, cold spraying or solid-phase sintering. Preferably, before forming a material comprising black titanium dioxide at the surface of the substrate, roughening treatment is performed on the surface of the substrate. By performing roughening treatment on the surface of the substrate, the binding force between the substrate and the nonstick layer is increased.

In the method described in the present invention, a suitable particle size of black titanium dioxide particles, which form the above-described nonstick layer 12, is 25 to 50 μm. For example, the particle size of black titanium dioxide particles can be 25 μm, 30 μm, 35 μm, 40 μm, 45 μm, or 50 μm. If black titanium dioxide powder with a particle size smaller than 25 μm is used, the preparation of the powder will be difficult to realize and will cause a high cost. A rough structure on a microscopic level can reduce the contact area between a food material and a utensil. Therefore, if black titanium dioxide powder with a particle size larger than 50 μm is used, a rough structure on a microscopic level cannot be formed.

In an embodiment of the method described in the present invention, the nonstick layer 12 comprising black titanium dioxide is formed at the surface of the substrate of the nonstick utensil by the solid-phase sintering process.

The solid-phase sintering process specifically comprises the following steps:

(1) performing pre-treatment on the surface of the substrate, the pre-treatment comprising cleaning and roughening the surface of the substrate, in order to increase the binding force between the substrate and the nonstick layer;

(2) mixing black titanium dioxide, graphite (0.5 to 10%) and polyethylene glycol (0.1 to 20%) according to the proportions (the total mass ratio of black titanium dioxide, graphite and polyethylene glycol is 100%) to form a powder mixture;

(3) adding the powder mixture into an aqueous solvent, adding a suitable amount of additive, stirring well and obtaining a slurry;

(4) spraying the slurry to an inner surface of the utensil with a spray gun and then performing sintering in an inert gas atmosphere;

(5) sintering for 0.5 to 3 hours at a temperature of 300 to 900° C. in an atmosphere of argon, obtaining a black titanium dioxide nonstick layer.

In some embodiments, the mass ratio of graphite, polyethylene glycol and black titanium dioxide is 0.5%:10%:89.5%. In some embodiments, the mass ratio of graphite, polyethylene glycol, and black titanium dioxide is 5%:20%:75%. In some embodiments, the mass ratio of graphite, polyethylene glycol, and black titanium dioxide is 10%:0.1%:89.9%. In some other embodiments, the mass ratio of graphite, polyethylene glycol, and black titanium dioxide is 2.5%:15%:82.5%.

In some embodiments, the sintering is performed in an atmosphere of argon, at a sintering temperature of 300° C., 500° C., 800° C., 850° C., or 900° C., for a sintering duration of 0.5 hour, 1 hour, 1.5 hours, 2 hours or 3 hours.

In the solid-phase sintering process, the addition of graphite and polyethylene glycol can make it easier for the black titanium dioxide in the material to form a slurry in subsequent operations, so as to facilitate spraying the slurry. In the step (3) of forming the slurry, the aqueous solvent comprises solvents such as water, ethanol, etc., and the additive added comprises substances such as surfactant and/or defoamer, in order to facilitate forming a qualified slurry.

In an embodiment of the method described in the present invention, the above-described nonstick layer 12 comprising black titanium dioxide can also be formed at the surface of the substrate of the nonstick utensil by the cold spraying process. The cold spraying process comprises the following steps: (1) pre-treating a surface of a substrate, including cleaning and surface roughening, so as to increase the binding force between the substrate and the nonstick layer; (2) introducing the material comprising powder-form black titanium dioxide of 300 to 500 mesh into a powder feeder of a cold spraying device; (3) heating the powder-form black titanium dioxide to 200 to 600° C. and spraying the heated powder-form black titanium dioxide to an inner surface of the substrate of a nonstick utensil by using a gas at a temperature of 200 to 600° C. and under a pressure of 1.5 to 2.5 MPa; wherein, the spray distance is 10 to 30 mm. In this cold spraying process, the gas can be compressed air, azote or argon.

In some embodiments, the particle size of the powder-form black titanium dioxide used in the step S2 is 300 mesh, 400 mesh or 500 mesh; next, the material comprising powder-form black titanium dioxide is heated to 200° C., 250° C., 300° C., 400° C., 500° C., 550° C. or 600° C. At the same time, by using compressed air, azote or argon as a spray gas and heating it to 200° C., 250° C., 300° C., 400° C., 500° C., 550° C. or 600° C., the material comprising powder-form black titanium dioxide is sprayed to the inner surface of the substrate; wherein, the spray distance can be 10 mm, 15 mm, 20 mm, 25 mm or 30 mm, and the spray gas pressure can be 1.5 MPa, 1.8 MPa, 2.0 MPa, 2.3 MPa or 2.5 MPa.

In another embodiment of the method described in the present invention, the above-described nonstick layer 12 comprising black titanium dioxide can also be formed at the surface of the substrate of the nonstick utensil by the plasma spraying process.

Figure 6:
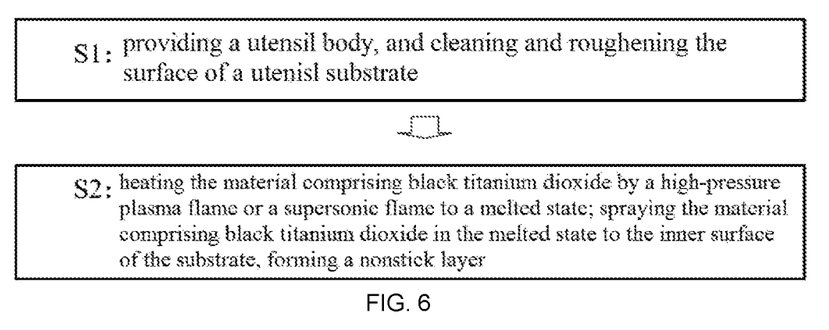
FIG. 6 is a flow chart of an embodiment of the method of manufacturing a nonstick layer of the present invention.

As shown in FIG. 6, which shows steps of preparing the nonstick layer of the nonstick utensil of the present invention, which specifically comprise:

cleaning and roughening the surface of the substrate 11; the surface roughness of the substrate 11 after the roughening is 2 to 6 µm;

introducing the material comprising powder-form black titanium dioxide of 300 to 500 mesh into a powder feeder of a plasma spraying device, the powder feeding speed being controlled between 20 to 40 g/min;

forming a high-pressure plasma flame at the muzzle of a spray gun of the plasma spraying device, heating a material comprising the powder-form black titanium dioxide until it melts, and then depositing it by spraying on the surface of the substrate 11, forming a nonstick layer 12; wherein, the process parameters of plasma spraying are as follows: the spray distance is 140 to 160 mm, the arc current is 450 to 550 A, the hydrogen pressure is 0.5 to 0.9 MPa, the hydrogen flow rate is 6 to 10 L/min, the argon pressure is 0.5 to 0.9 MPa, and the argon flow rate is 40 to 70 L/min.

In some embodiments, the roughness of the surface of the substrate 11 after the roughening is 2.0 µm, 2.5 µm, 3.0 µm, 3.5 µm, 4.0 µm, 5.0 µm, or 6.0 µm.

For example, in the step S2, when the material comprising black titanium dioxide is introduced into the powder feeder, the powder feeding speed can be 20 g/min, 25 g/min, 30 g/min, 35 g/min, or 40 g/min. Preferably, the particle size of the black titanium dioxide can be 300 mesh, 450 mesh, or 500 mesh.

When the material comprising black titanium dioxide is heated until melted and then sprayed to the inner surface of the substrate, the spray distance can be 140 mm, 145 mm, 150 mm, 155 mm, or 160 mm; the arc current can be 450 A, 460 A, 470 A, 480 A, 500 A, 520 A, 525 A, 535 A, 545 A, or 550 A; the hydrogen pressure can be 0.5 MPa, 0.55 MPa, 0.60 MPa, 0.70 MPa, 0.80 MPa, 0.85 MPa or 0.90 MPa; the hydrogen flow rate can be 6.0 L/min, 6.5 L/min, 7.0 L/min, 8.0 L/min, 9.0 L/min, 9.5 L/min, or 10 L/min; the argon pressure can be 0.50 MPa, 0.55 MPa, 0.60 MPa, 0.70 MPa, 0.80 MPa, 0.85 MPa, or 0.90 MPa; the argon flow rate can be 40 L/min, 45 L/min, 50 L/min, 60 L/min, 65 L/min or 70 L/min.

After the nonstick layer 12 is formed at the surface of the substrate 11, the formed nonstick layer 12 is polished so as to reach a roughness of the nonstick layer 12 of 30 to 50 µm. For example, the roughness of the nonstick layer after the polishing is 30 µm, 35 µm, 40 µm, 45 µm, or 50 µm. Thanks to the polishing, the surface of the nonstick layer can be smooth, so as to facilitate cleaning the inner surface of a nonstick pan.

Further, after the nonstick layer 12 is formed, sealing treatment of the formed nonstick layer can also be performed. Sealing treatment is a method well known in the art. The surface of the nonstick layer can be covered with a sealing agent by means of soaking, spraying or wiping. The sealing agent used in the sealing treatment is chosen from an inorganic or organic coating material in conformance with food sanitation standards, such as a ceramic or fluororesin material. A person skilled in the art can make a choice based on specific needs. After a nonstick layer is obtained by spraying, microscopic pores exist in the surface of the coating. The presence of such pores will result in a decrease of the nonstick layer's nonstickness and corrosion resistance. Therefore, the use of a sealing agent can increase the nonstick layer's nonstickness and corrosion resistance and prolong the nonstick layer's life of service.

The properties of the nonstick layer of a nonstick pan of the present invention are tested below.

A material comprising black titanium dioxide is applied to a nonstick pan according to the method of the present invention. The life of nonstickness of the nonstick layer comprising black titanium dioxide is evaluated by an accelerated simulation testing method.

Testing Method

The nonstickness life is evaluated in reference to a nonstick pan accelerated simulation testing program. The testing procedure is as follows:

A: stir frying quartz stone→B: vibration wear resistance testing→C: steel wire wear resistance testing→D: dry cooking a mixed sauce→E: heating saline water→F: evaluating the level of nonstickness when frying an egg. When the above 5 testing steps and one evaluation of the level of nonstickness are completed, it means that a cycle ends.

When performing the accelerated simulation testing, the life of nonstickness is determined after each cycle ends. When one of the following phenomena occurs, it can be determined as the endpoint:

1. Nonstickness decreases:

In two consecutive cycles, the level of nonstickness when frying an egg is level III;

2. The appearance is damaged:

Peeling-off of the nonstick layer occurs;

The diameter of the delamination area of the nonstick layer is larger than 3 mm;

Wearing is significant and the substrate is exposed;

More than 3 scratches of piercing type (substrate exposed) appear on the nonstick layer;

A stain inerasable by a wet mop appears;

The number of finished cycles of the simulation testing when the testing reaches the endpoint is recorded as the nonstickness life of the product. The larger the number of cycles, the longer the nonstickness life of the nonstick layer is.

TABLE 1

Results of Testing of Nonstick Layer's Nonstickness

Testing Type
Accelerated Simulation Testing
Testing Standard
Nonstick Frying Pan Accelerated Simulation Testing Standard
Coating Type

| | Existing Iron Pan | | | Existing Fluorine Coated Pan | | | Black Titanium Dioxide Nonstick Pan | | |
|---|---|---|---|---|---|---|---|---|---|
| Sample No. | 1# | 2# | 3# | 4# | 5# | 6# | 7# | 8# | 9# |
| Number of Cycles Initially Nonstick | Level of Nonstickness | | | | | | | | |
| 1 | III | II | III | I | I | I | I | I | I |
| 2 | III | III | III | I | I | I | I | I | I |
| 3 | — | III | — | I | I | I | I | I | I |
| 4 | — | — | — | I | I | I | II | I | I |
| 5 | — | — | — | I | I | I | II | II | I |
| 6 | — | — | — | I | I | II | II | II | II |
| 7 | — | — | — | II | II | II | III | II | II |
| 8 | — | — | — | II | II | II | III | III | III |
| 9 | — | — | — | III | II | III | — | III | III |
| 10 | — | — | — | III | III | III | — | — | — |
| 11 | — | — | — | — | III | — | — | — | — |
| Number of Cycles | 0 | 1 | 0 | 8 | 9 | 8 | 6 | 7 | 7 |

TABLE 2

Results of Testing of Nonstick Layer's Nonstickness

Testing Type
Accelerated Simulation Testing
Testing Standard
Nonstick Frying Pan Accelerated Simulation Testing Standard
Coating Type

| | Existing Stainless Steel Pan | | | Existing Fluorine Coated Pan | | | Black Titanium Dioxide Nonstick Pan | | |
|---|---|---|---|---|---|---|---|---|---|
| Sample No. | 1# | 2# | 3# | 4# | 5# | 6# | 7# | 8# | 9# |
| Number of Cycles Initially Nonstick | Level of Nonstickness | | | | | | | | |
| 1 | III | III | III | I | I | I | I | I | I |
| 2 | III | III | III | I | I | I | I | I | I |
| 3 | — | — | — | I | I | I | I | II | I |
| 4 | — | — | — | I | I | I | II | II | I |
| 5 | — | — | — | I | I | II | II | II | I |
| 6 | — | — | — | I | I | I | II | II | I |
| 7 | — | — | — | I | II | I | II | II | II |
| 8 | — | — | — | I | II | II | III | III | II |
| 9 | — | — | — | II | II | II | III | III | III |
| 10 | — | — | — | II | III | II | — | — | III |
| 11 | — | — | — | II | III | III | — | — | — |
| 12 | — | — | — | III | — | III | — | — | — |
| 13 | — | — | — | III | — | — | — | — | — |
| Number of Cycles | 0 | 0 | 0 | 11 | 9 | 10 | 7 | 7 | 8 |

In the above, the existing stainless steel pan, the existing fluorine coated nonstick pan and black titanium dioxide nonstick pan in the tables above have the same pan body thickness, substrate pre-treatment, etc. It can be seen from Table 1 and Table 2 that the nonstickness of a nonstick pan having a nonstick layer of black titanium dioxide is slightly lower than that of a fluorine coated nonstick pan, but it is significantly higher than that of an iron pan or a stainless steel pan. Therefore, black titanium dioxide can be used as a material for the nonstick layer of a nonstick pan and achieves a very good nonstick effect.

Now, the effect on the nonstickness of the doping ratio of other materials in a nonstick layer is described. Table 3 shows the effect of the doping ratio on nonstickness when a nonstick layer is doped with other materials than black titanium dioxide.

TABLE 3

Testing Type
Accelerated Simulation Testing
Testing Standard
Nonstick Frying Pan Accelerated Simulation Testing Standard
Coating Type
Black Titanium Dioxide Nonstick Pan
Doping Ratio of the Nonstick Layer

| | 0% | | | 10-20 | | | 20-30 | | | 30-40 | | | 40-50 | | |
|---|---|---|---|---|---|---|---|---|---|---|---|---|---|---|---|
| Sample No. | 1# | 2# | 3# | 4# | 5# | 6# | 7# | 8# | 9# | 10# | 11# | 12# | 13# | 14# | 15# |
| Number of Cycles | | | | | | | Level of Nonstickness | | | | | | | | |
| 1 | I | I | I | I | I | I | I | I | I | II | II | I | II | II | II |
| 2 | I | I | II | I | I | I | II | II | I | II | II | II | II | III | III |
| 3 | I | I | I | I | II | II | II | II | II | II | II | II | III | III | III |
| 4 | I | II | I | II | I | II | II | II | II | II | III | II | III | — | — |
| 5 | I | II | II | II | III | II | II | III | II | III | III | III | — | — | — |
| 6 | II | II | II | II | III | III | II | III | III | III | — | III | — | — | — |
| 7 | II | III | II | III | — | III | III | — | III | — | — | — | — | — | — |
| 8 | II | III | III | III | — | — | III | — | — | — | — | — | — | — | — |
| 9 | III | — | III | — | — | — | — | — | — | — | — | — | — | — | — |
| 10 | III | — | — | — | — | — | — | — | — | — | — | — | — | — | — |
| Number of Cycles | 8 | 6 | 7 | 6 | 4 | 5 | 6 | 4 | 5 | 4 | 3 | 4 | 2 | 1 | 1 |

It can be seen from Table 3 that, for a pure black titanium dioxide nonstick layer (i.e., the doping ratio of other materials in the nonstick layer is 0%), even after multiple cycles, it still has a good nonstickness. As the doping ratio in the nonstick layer increases, the number of cycles that the nonstick layer can sustain continues to decrease. Thus, it can be seen that, the higher the content of black titanium dioxide in a nonstick layer prepared and obtained according to the method of the present invention is (i.e., the lower the doping ratio is), the longer the life of the nonstick layer is and also the better the nonstick effect is. When the doping ratio exceeds 40, the nonstick effect is very poor.

The effect of surface roughness of the nonstick layer on nonstickness is studied below. Table 4 shows the effect of surface roughness ($R_a$) of a nonstick layer on nonstickness.

TABLE 4

Testing Type
Accelerated Simulation Testing
Testing Standard
Nonstick Frying Pan Accelerated Simulation Testing Standard
Coating Type
Black Titanium Dioxide Nonstick Pan
$R_a$/μm

| | <10 | | | 10-30 | | | 30-50 | | | >50 | | |
|---|---|---|---|---|---|---|---|---|---|---|---|---|
| Sample No. | 1# | 2# | 3# | 4# | 5# | 6# | 7# | 8# | 9# | 10# | 11# | 12# |
| Number of Cycles | | | | | | Level of Nonstickness | | | | | | |
| 1 | II | I | II | I | II | I | I | I | I | The roughness is too high. An iron spatula cannot slide normally. Testing cannot be performed. | | |
| 2 | II | III | III | I | II | I | I | I | I | | | |
| 3 | III | III | III | II | II | II | I | I | I | | | |
| 4 | III | — | — | II | II | I | II | I | I | | | |
| 5 | — | — | — | II | II | I | I | II | II | | | |
| 6 | — | — | — | II | II | II | II | II | II | | | |
| 7 | — | — | — | III | III | II | II | II | II | | | |
| 8 | — | — | — | III | III | III | III | III | II | | | |
| 9 | — | — | — | — | — | III | III | III | III | | | |
| 10 | — | — | — | — | — | — | — | — | III | | | |
| Number of Cycles | 2 | 1 | 1 | 6 | 6 | 7 | 7 | 7 | 8 | | | |

It can be seen from Table 4 that, when the surface roughness of the nonstick layer ($R_a$) is higher than 50 μm, it will be impossible for an iron spatula to slide normally, and thus make it impossible to perform the testing. Therefore, if the roughness of a nonstick layer is too high, it will greatly reduce the utilization experience of a nonstick pan. Overall speaking, the suitable surface roughness of the nonstick layer comprising black titanium dioxide is 10 to 50 μm.

Even though the present application is disclosed as above with preferred embodiments, they are not used to limit the claims. Any skilled person in the art can make certain possible changes and modifications without departing from the idea of the present application. Therefore, the scope of protection of the present application should be determined by the scope defined by the claims of the present application.

The invention claimed is:

1. A nonstick utensil, the nonstick utensil comprising:
   a utensil substrate; and,
   a nonstick layer covering an inner surface of the utensil substrate;
   wherein, the material of the nonstick layer comprises black titanium dioxide.

2. The nonstick utensil according to claim 1, wherein, the material of the nonstick layer comprises 60 to 99.5% of black titanium dioxide and 40 to 0.5% of a ceramic material and at least one of a metal or a nonmetal other than the black titanium dioxide.

3. The nonstick utensil according to claim 1, wherein, a metallic base layer is further provided between the utensil substrate and the nonstick layer, the hardness of the metallic base layer being above Moh's hardness 3.

4. The nonstick utensil according to claim 3, wherein, the metallic base layer has a thickness of 50 μm to 300 μm, and a surface of the metallic base layer has a surface roughness of 10 μm to 50 μm.

5. The nonstick utensil according to claim 1, wherein, an inner surface of the utensil substrate is provided with protruding patterns having a section in the form of a triangle, quadrilateral, polygon or circle.

6. The nonstick utensil according to claim 1, wherein, the nonstick layer has a roughness of 10 to 50 μm and a thickness of 50 to 300 μm.

7. The nonstick utensil according to claim 1, wherein, the nonstick layer is formed by hot spraying.

8. The nonstick utensil according to claim 1, wherein, the black titanium dioxide is in the form of particles and has a particle size of 25 to 50 μm.

9. The nonstick utensil according to claim 1, wherein, an inner surface of the utensil substrate is a layer of aluminum and/or aluminum alloy, and an anodized film layer or micro-arc oxidized film layer is further provided between the aluminum and/or aluminum alloy layer and the nonstick layer.

10. A method of manufacturing a nonstick utensil, comprising:
    step S1: providing a utensil body;
    step S2: covering an inner surface of a substrate of the utensil body with a material comprising black titanium dioxide and forming a nonstick layer comprising black titanium dioxide.

11. The method according to claim 10, wherein, in the step S2, the inner surface of the substrate is covered with the material comprising black titanium dioxide by means of hot spraying, cold spraying or solid-phase sintering to form the nonstick layer.

12. The method according to claim 10, wherein, the step S2 comprises:
    heating the material comprising black titanium dioxide to a melted state by a high-pressure plasma flame or a supersonic flame;
    spraying the material comprising black titanium dioxide in the melted state to the inner surface of the substrate to form the nonstick layer.

13. The method according to claim 12, wherein, the step S2 comprises:
    introducing the material comprising black titanium dioxide into a powder feeder, the powder feeding speed being maintained within the range of 20 to 40 g/min;
    heating the material comprising black titanium dioxide until melted, and then spraying it to the inner surface of the substrate, forming the nonstick layer; wherein, the spray distance is 140 to 160 mm, the arc current is 450 to 550 A, the hydrogen pressure is 0.5 to 0.9 MPa, the hydrogen flow rate is 6 to 10 L/min, the argon pressure is 0.5 to 0.9 MPa, and the argon flow rate is 40 to 70 L/min.

14. The method according to claim 13, wherein, the method further comprises, after the step S2, performing a sealing treatment of the nonstick layer formed at the surface of the substrate, the sealing treatment comprising: covering the surface of the nonstick layer with a sealing agent by soaking, spraying or wiping.

15. The method according to claim 14, wherein, the sealing agent used in the sealing treatment is a ceramic or fluororesin.

16. The method according to claim 10, wherein, the step S2 comprises:
    mixing graphite of a mass ratio of 0.5 to 10%, polyethylene glycol of a mass ratio of 0.1 to 20%, and powder-form black titanium dioxide for the rest to form a powder mixture;
    adding the powder mixture to an aqueous solvent, adding an additive, and stirring well, obtaining a slurry;
    covering the inner surface of the utensil body with the slurry and sintering in an atmosphere of an inert gas.

17. The method according to claim 16, wherein, the aqueous solvent is chosen from water and/or ethanol, and the additive is chosen from a surfactant and/or a defoamer.

18. The method according to claim 16, wherein, the sintering is performed in an atmosphere of argon, at a sintering temperature of 300 to 900° C., for a sintering duration of 0.5 to 3 hours.

19. The method according to claim 10, wherein, the step S2 comprises:
    introducing powder-form black titanium dioxide of 300 to 500 mesh into a powder feeder;
    heating the powder-form black titanium dioxide to 200 to 600° C.;
    spraying the powder-form black titanium dioxide to the inner surface of the substrate, by using compressed air, azote or argon as a spray gas and heating it to 200 to 600° C.; wherein, the spray distance is 10 to 30 mm, and the spray gas pressure is 1.5 to 2.5 MPa.

20. The method according to claim 10, wherein, the step S1 further comprises performing a pre-treatment to the surface of the substrate of the utensil body, the pre-treatment comprising: cleaning and roughening the surface of the substrate, the roughness of the surface of the substrate after the roughening being 2 to 6 μm.

* * * * *

UNITED STATES PATENT AND TRADEMARK OFFICE
CERTIFICATE OF CORRECTION

PATENT NO. : 11,357,354 B2  
APPLICATION NO. : 16/748157  
DATED : June 14, 2022  
INVENTOR(S) : Huating Yuan et al.

Page 1 of 1

It is certified that error appears in the above-identified patent and that said Letters Patent is hereby corrected as shown below:

On the Title Page

Column 1, Assignee, Line 1, Delete "Ltd." and insert -- Ltd., (CN) --

Signed and Sealed this
Ninth Day of August, 2022

Katherine Kelly Vidal  
*Director of the United States Patent and Trademark Office*